(12) United States Patent
Rhetat et al.

(10) Patent No.: US 8,931,659 B2
(45) Date of Patent: Jan. 13, 2015

(54) PRESSURE COOKER WITH A PLASTIC TRIM

(75) Inventors: Eric Jacques Rhetat, Dijon (FR); Michel Pierre Cartigny, Mirebeau sur Beze (FR)

(73) Assignee: SEB S.A., Ecully Cedex (FR)

( * ) Notice: Subject to any disclaimer, the term of this patent is extended or adjusted under 35 U.S.C. 154(b) by 1054 days.

(21) Appl. No.: 12/175,024

(22) Filed: Jul. 17, 2008

(65) Prior Publication Data

US 2009/0020539 A1    Jan. 22, 2009

(30) Foreign Application Priority Data

Jul. 20, 2007    (FR) ...................................... 07 05263

(51) Int. Cl.
  *A47J 27/00*    (2006.01)
  *A47J 27/09*    (2006.01)
  *A47J 27/08*    (2006.01)

(52) U.S. Cl.
  CPC .............. *A47J 27/09* (2013.01); *A47J 27/0804* (2013.01)
  USPC ...................................... 220/573.1; 220/315

(58) Field of Classification Search
  USPC ....................... 220/573.1, 293, 315, 316, 298; 126/369; 99/337
  See application file for complete search history.

(56) References Cited

U.S. PATENT DOCUMENTS

| | | | |
|---|---|---|---|
| 4,627,417 A * | 12/1986 | von der Becke et al. ...... | 126/369 |
| 5,297,473 A * | 3/1994 | Thelen et al. ................... | 99/337 |
| 5,678,721 A * | 10/1997 | Cartigny et al. ............... | 220/316 |
| 6,425,320 B1 * | 7/2002 | Chameroy et al. .............. | 99/337 |
| 6,669,047 B2 * | 12/2003 | Wooderson et al. .......... | 220/316 |
| 6,824,004 B1 * | 11/2004 | Wooderson .................... | 220/318 |
| 7,082,871 B2 * | 8/2006 | Schultz ............................ | 99/337 |
| 2003/0209551 A1 * | 11/2003 | Park ............................ | 220/573.1 |
| 2003/0229969 A1 * | 12/2003 | Park ................................ | 16/425 |

* cited by examiner

*Primary Examiner* — Jeffrey Allen
(74) *Attorney, Agent, or Firm* — McClure, Qualey & Rodack, LLP

(57) ABSTRACT

A domestic pressure cooker (1) is disclosed comprising at least a pan (2) and a lid designed to be added to the pan (2) to form a cooking chamber with the latter. The lid has an inside face designed to be positioned opposite the inside of the chamber and an outside face opposite thereof, characterized in that it comprises a plastic trim which substantially covers all of the outside face.

20 Claims, 6 Drawing Sheets

PRESSURE COOKER WITH A PLASTIC TRIM

CROSS REFERENCE RELATED APPLICATIONS

This application claims priority to copending French Patent Application No. 07 05263 filed Jul. 20, 2007, which is entirely incorporated herein by reference.

This invention relates to the general technical field of kitchen utensils of the cooking recipient type, and especially to that of pressure cookers, which is to say pressurised cooking pots designed to cook food they contain using pressurised steam.

This invention relates more particularly to a domestic pressure cooker comprising at least a pan and a lid designed to be attached to the pan to form with the latter a cooking chamber, wherein lid has an inside face designed to be positioned opposite the inside of the chamber and an opposite outside face.

Domestic pressure cookers are well-known. They are usually composed of a metallic pan designed to accommodate food and a lid, also metallic, designed to be added and locked onto the pan to form with the latter an impervious cooking chamber.

Such a pressure cooker is designed to be subjected to the influence of a source of heat (such as for example a cooking hob) so as to permit the increase in pressure and temperature of the chamber and thus the pressurised cooking of the food contained therein.

These appliances thus permit food to be cooked with pressurised steam that is especially efficient and respects the organoleptic and nutritional qualities of the food.

These known pressure cookers however have a very technical aspect whose nature frightens off many potential users.

In other terms, the known pressure cookers often generate a feeling of fear for many users or potential users, even though it is unfounded as these appliances are generally very simple and safe to use, it remains nevertheless present in their minds and dissuades many people from using these appliances in spite of the benefits, in terms of rapidity and quality of cooking, that they can provide.

This feeling of fear is heightened by the fact that during cooking, the metal parts of the known pressure cookers reach high temperatures that consequently generate a risk of being burned that is indeed real, if the user touches inadvertently one of the metal parts in question, if trying to modify a setting of the appliance for example.

Finally, the feeling of fear mentioned above is also reinforced by the perception of the deformation of the lid when the pressure increases. Such deformation may in fact occur depending on the profiled sections which, even though they are normal and without danger, may be spectacular and evoke danger for certain people, especially for pressure cookers with inside lids, which is to say where the is inserted inside the pan.

The assigned purposes of the invention thus aim to overcome the various disadvantages mentioned above and to propose a new domestic pressure cooker whose construction is not only particularly safe, but further contributes to reducing the feeling of fear in particular of the user while improving the energy efficiency of the pressure cooker.

Another purpose of the invention aims to propose a new domestic pressure cooker whose construction, while remaining compact and cheap, permits the relative positioning of the lid and the pan to be controlled.

Another purpose of the invention aims to propose a new domestic pressure cooker whose construction, while remaining compact and cheap, permits the use of means of locking/releasing the lid from the pan requiring specific relative positioning of the lid on the pan.

Another purpose of the invention aims to propose a new domestic pressure cooker that is particularly safe.

Another purpose of the invention aims to propose a new domestic pressure cooker of particularly simple, cheap and compact construction.

Another purpose of the invention aims to propose a new domestic pressure cooker whose operation is based on simple and reliable mechanical principles.

Another purpose of the invention aims to propose a new domestic pressure cooker which, while remaining very safe, has a particularly cheap construction.

Another purpose of the invention aims to propose a new domestic pressure cooker which considerably limits the feeling of fear that may be experienced by the user when the metal parts of the pressure cooker are deformed by the increase in pressure.

Another purpose of the invention aims to propose a new domestic pressure cooker equipped with very reliable and discreet locking/release means.

Another purpose of the invention aims to propose a new domestic pressure cooker that is particularly cheap.

The assigned purposes of the invention are achieved by means of a domestic pressure cooker comprising at least a pan and a lid designed to be added to the pan to form with the latter a cooking chamber, wherein said lid has an inside face designed to be positioned opposite the inside of the chamber and an outside face opposite, characterised in that it comprises a plastic trim which substantially covers all of said outside face.

Other specific aspects and advantages of the invention will appear and in more detail upon reading the following description, in reference to the appended drawings provided by way of illustration and in no way restrictively, in which.

Figure 1:
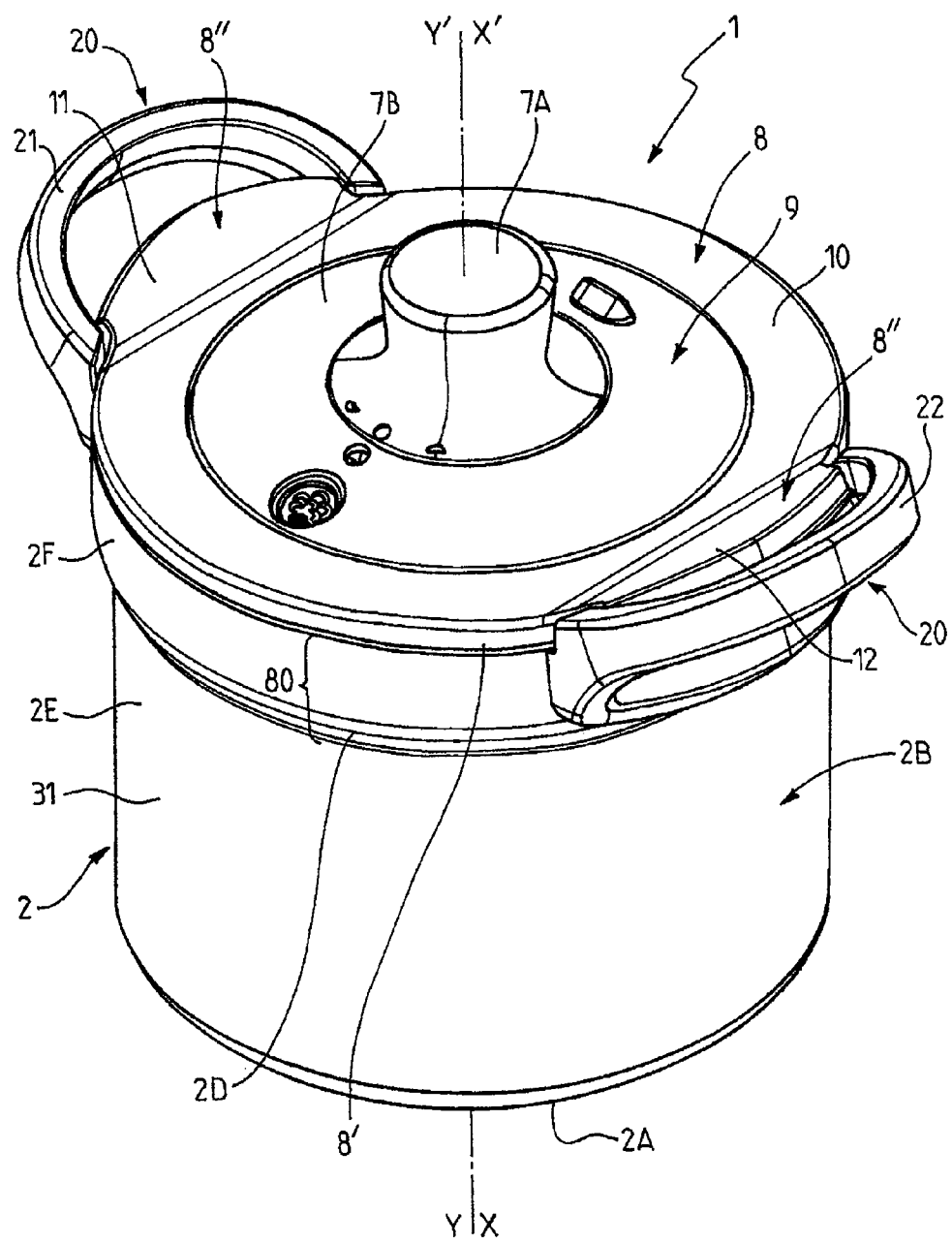
FIG. 1 illustrates, according to a general perspective view, a first embodiment of a domestic pressure cooker compliant with the invention.

The pressure cooker 1 compliant with the invention is designed to cook different foods under pressure, in a domestic context. It thus forms a domestic pressure cooker. The pressure cooker 1 compliant with the invention is therefore a kitchen utensil that is portable (which is to say it may be moved manually) and independent.

Preferably, the pressure cooker 1 compliant with the invention is thermally passive, which is to say that it is designed to increase in pressure under the effect of an external source of heat, such as a cooking hob. In other terms, the pressure cooker 1 is preferably designed to be associated to an independent, external source of heat.

The pressure cooker 1 compliant with the invention comprises at least a pan 2 forming a cooking recipient and advantageously substantially with a revolution symmetry according to an axis X-X'. In the rest of the description, the adjective "axial" refers to the direction of this axis of symmetry X-X', a direction which is similar to the vertical direction when the appliance is in normal use, the pan 2 is for example and usually manufactured by stamping a blank made from a metallic material such as aluminium or stainless steel.

The pan 2 also comprises a wall, wherein said wall itself comprises, in the embodiment shown, a base 2A, which has for example a disc shape.

The pan also comprises a lateral wall 2B, which rises from and at the base 2A. Said lateral wall 2B preferably has a substantially annular form which defines an upper opening 2C permitting the food to be introduced into the pan 2, so that they may be cooked. The lateral wall 2B also has an inside face 30 positioned opposite the inside of the pan 2 and an outside face 31 opposite.

Preferably, as illustrated in the figures, the lateral wall 2B itself comprises a convergent portion 2D, for example with a substantially truncated shape with an axis of symmetry X-X', wherein said convergent portion 2D is positioned between a first straight portion 2E and a second straight portion 2F with a diameter that is greater than that of the first portion 2E, wherein the second straight portion 2F defines the upper opening 2C of the pan 2. The pan 2 thus rises from its base 2A and flares out to an upper free edge 2G which defines the upper opening 2C.

The pressure cooker 1 compliant with the invention also comprises a lid 3 designed to be added onto said pan 2 to form a cooking chamber with the latter. The cooking chamber is preferably substantially impervious, which is to say sufficiently hermetic to allow the pressure inside it to increase. Consequently, the chamber formed by joining the pan 2 and the lid 3 is designed to permit a considerable increase in the pressure inside it, so that during cooking, the pressure inside the chamber may be significantly higher than the atmospheric pressure, and for example exceed said atmospheric pressure by a value equal to or greater than 10 kPa, and preferably equal to or greater than 20 kPa. It may also be envisaged, in order to permit very rapid and efficient cooking, for the chamber to be designed so that the pressure inside it may exceed the atmospheric pressure by a value substantially between 40 and 110 kpa, and preferably substantially between 50 and 100 kPa.

The lid 3 preferably has a general disc shape, that is complementary to the shape of the pan 2 and has an inside face 3' designed to be positioned opposite the inside of the chamber and an outside face 3" opposite. Preferably and as illustrated in the figures, the lid 3 has a generally circular form, which is to say that it has in particular an axis of symmetry Y-Y'.

Advantageously, the lid 3 is an inside lid, which is to say that it is designed to be inserted inside the pan 2, so that it is surrounded by the lateral wall 2B of the pan 2, and more precisely by the inside face 30 of the lateral wall 2B. The lid 3 in this case ensures the seal in the cooking chamber by forming an impervious contact with the inside face 30 of the convergent portion 2D

For this purpose, the lid 3 preferably comprises an annular seal 3C which creates the impervious contact between the pan 2, and more precisely the inside face 30 of the pan 2, and the rest of the lid 3.

Figure 8:
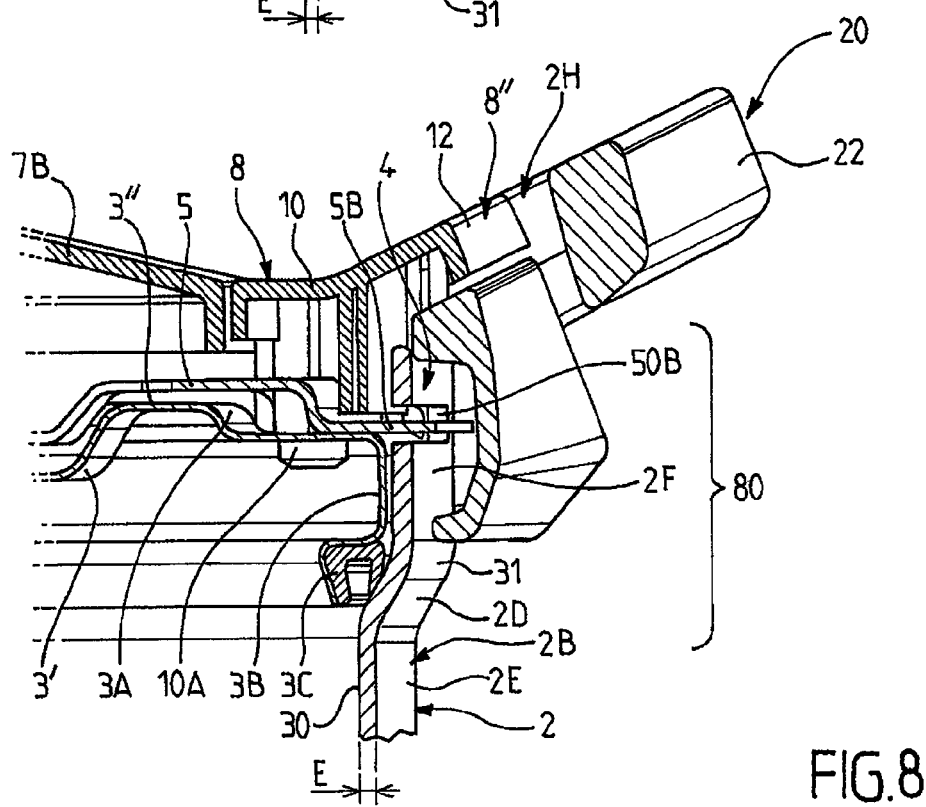

Preferably, the lid 3 comprises a descending edge 3B, substantially extending towards the bottom from a main body 3A itself designed to be positioned parallel to the base 2A when the lid 3 is added to the pan 2. The descending edge 3B is designed to be introduced into the pan 2, inside the latter, so that it extends substantially opposite the second portion 2F, wherein the seal 3C encircles the descending edge 3B on a recess provided for this purpose, and comes into contact with the truncated portion 2D, as may be seen in particular in FIG. 8.

Figure 2:
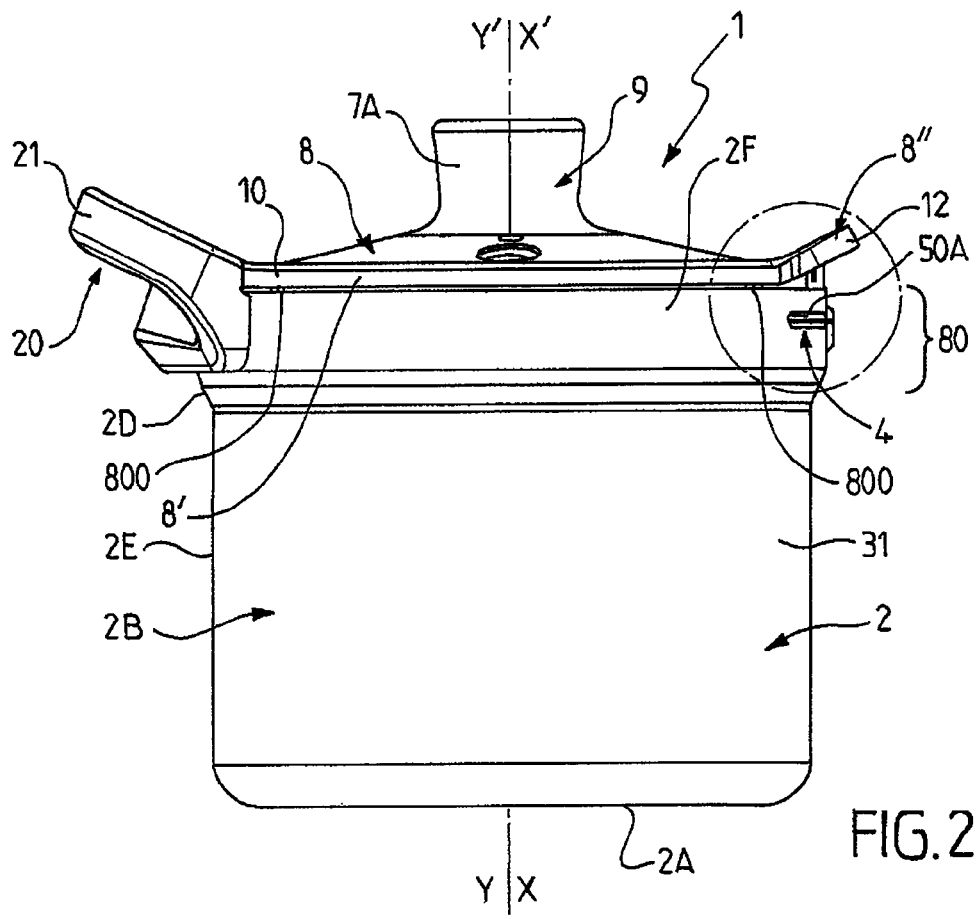
FIG. 2 illustrates, according to an elevation view, the pressure cooker of FIG. 1, without one of its handles.
Figure 3:
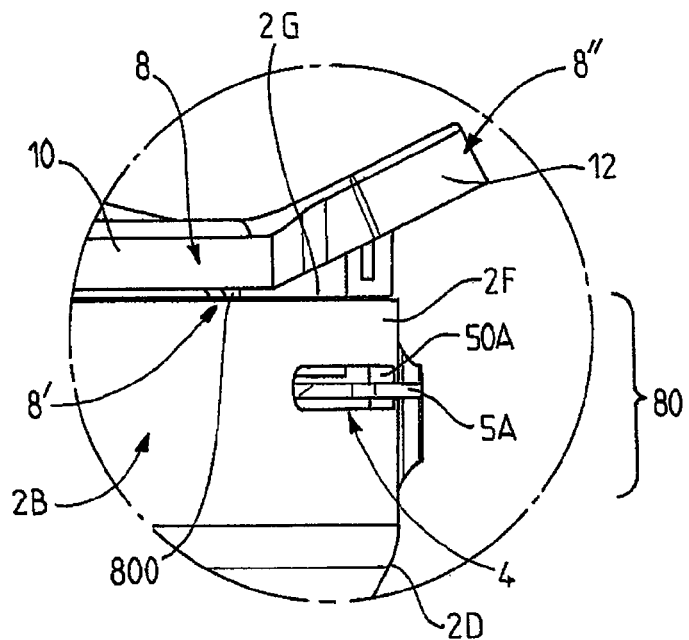
FIG. 3 is an enlarged view of the detail encircled in FIG. 2.
Figure 4:
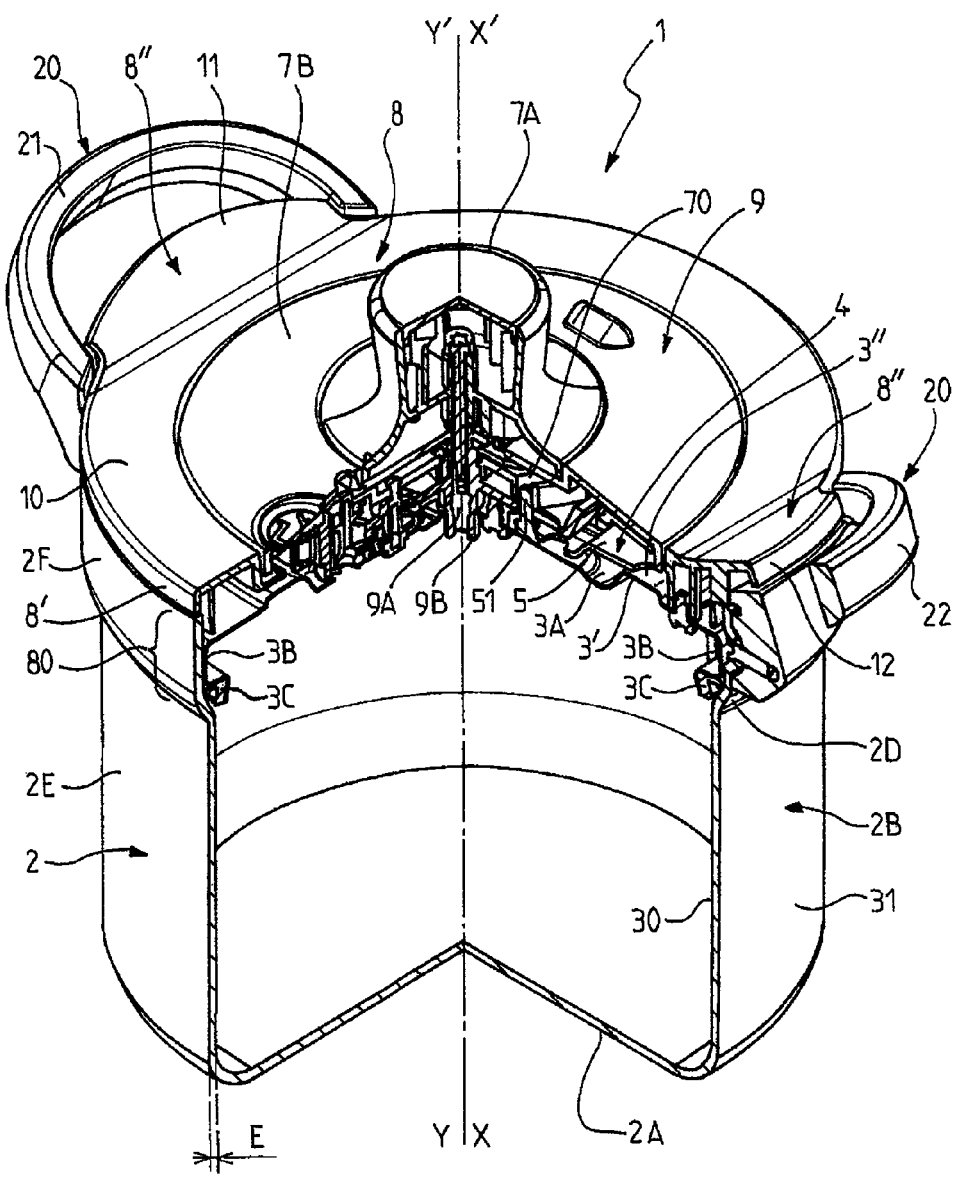
FIG. 4 is a partially cross sectioned view according to two orthogonal cross section planes of the pressure cooker of FIG. 1.
Figure 5:
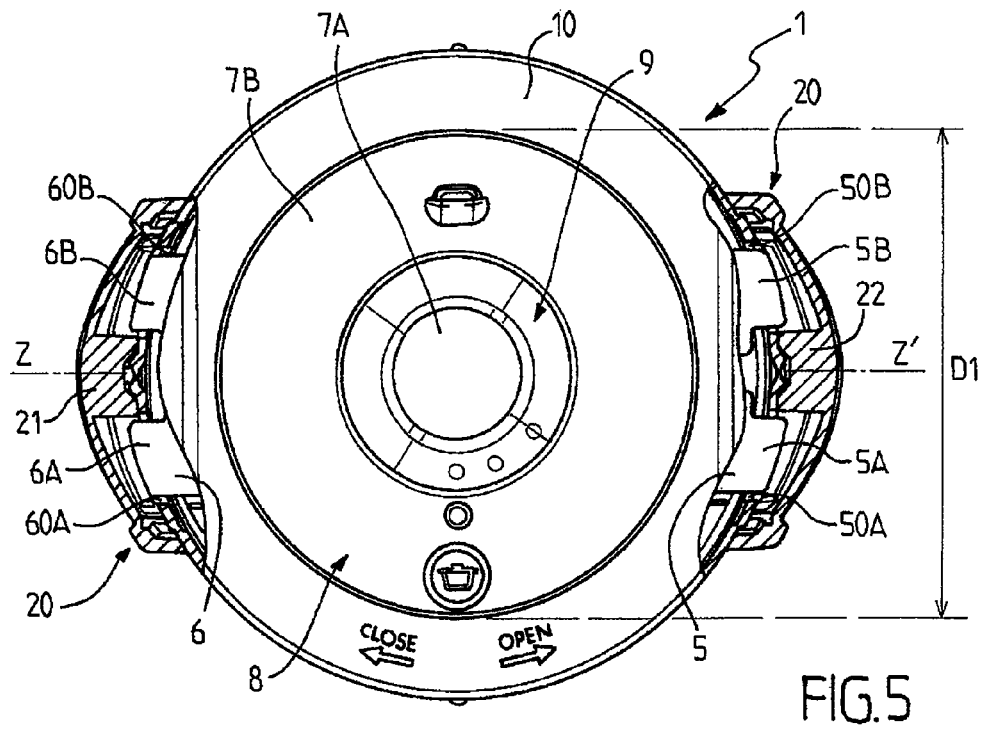
FIG. 5 is a partially cross sectioned top view of the pressure cooker of FIGS. 1 to 4 with its locking/release means in locked configuration.
Figure 6:
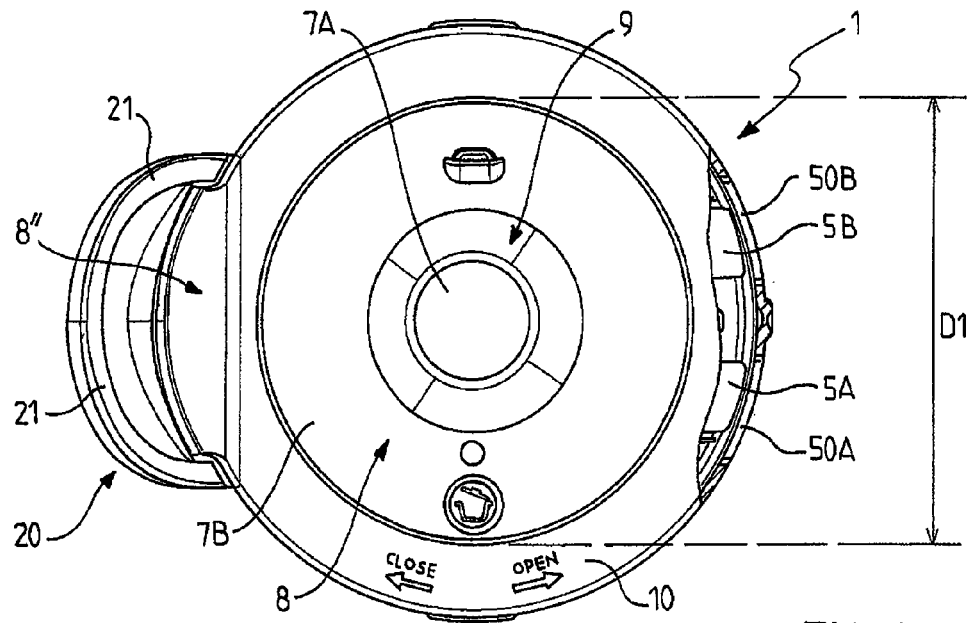
FIG. 6 is a top view of the pressure cooker of FIGS. 1 to 5 without its handles and wherein the means of locking/release is in the released configuration.
Figure 7:
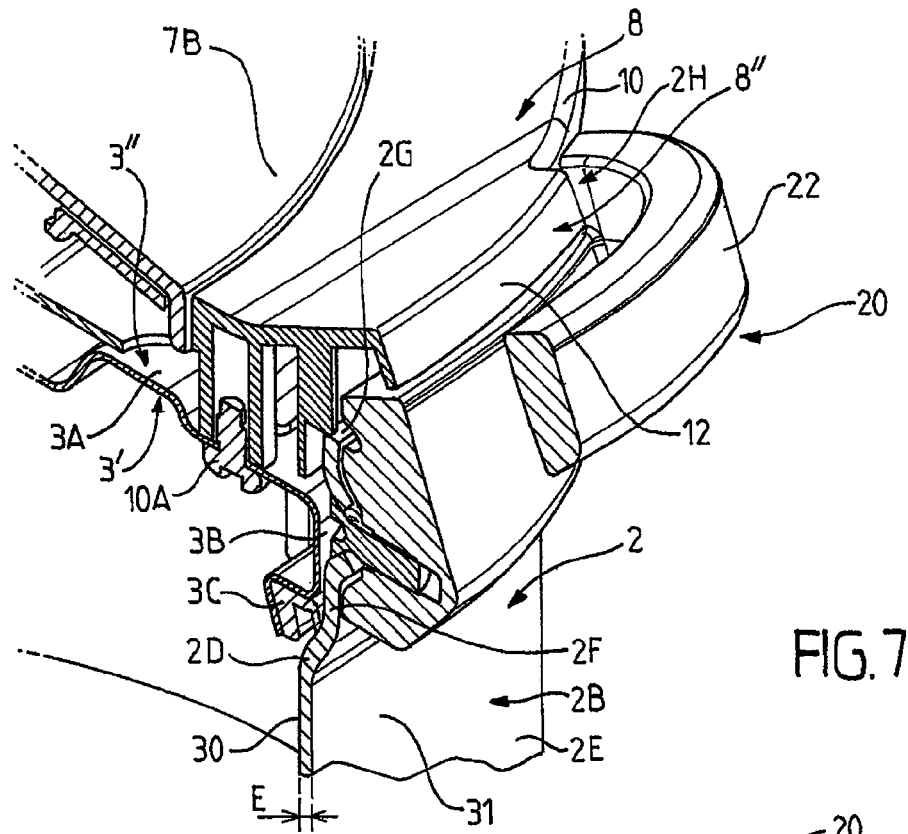
FIGS. 7 and 8 illustrate a same detail of the pressure cooker of FIGS. 1 to 6, in a partial cross sectioned view according to two section planes that are respectively different.

Advantageously, the lid 3 may be locked or released as required on the pan 2, wherein locking the lid 3 permits the chamber to increase in pressure without the lid 3 escaping under the effect of the pressure. For this purpose, the pressure cooker 1 preferably comprises means 4 of locking/releasing the lid 3 onto the pan 2. The means 4 of locking/releasing is advantageously designed to move between a configuration where the lid 3 is locked in relation to the pan 2 (illustrated in particular in FIGS. 2, 3, 5. 8) in which the lid 3 is attached to the pan 2, and a configuration where the lid 3 is released in relation to the pan 2 (illustrated in particular in FIG. 6), in which the lid 3 may be freely separated from the pan 2.

As illustrated in the figures, the locking/release means 4 at least comprise a locking opening 50A, 50B, 60A, 60B through the wall of the pan 2, which is to say passing through the entire thickness E of the wall of the pan.

In the example illustrated in the figures, the pressure cooker 1 comprises four locking openings 50A, 50B, 60A, 60B preferably located in the upper part 80 of the wall 2B of the pan 2, which is to say towards the upper opening 2C of the pan 2, in the second portion 2F. As illustrated in the figures, said locking openings 50A, 50B, 60A, 60B are preferably grouped into pairs, wherein said pairs are diametrically opposite one another.

Compliant with the invention, the locking/release means 4 further comprise at least one pin 5A, 5B, 6A, 6B with a mobile mounting on the lid 3 between a position where the lid 3 is locked (illustrated in particular in FIG. 5) in which the pin 5A, 5B, 6A, 6B is engaged in the corresponding locking opening 50A, 50B, 60A, 60B to prevent any separation of the lid 3 from the pan 2, in the same way as a pin—strike plate system, and a position where the lid 3 is released (illustrated in FIG. 6), in which the pin 5A, 5B, 6A, 6B is clear of the corresponding locking opening 50A, 50B, 60A, 60B to permit the lid 3 to move freely in relation to the pan, and in particular for the use to separate the lid 3 and the pan 2.

Preferably, as illustrated in the figures, the pressure cooker 1 comprises a number of pins 5A, 5B, 6A, 6B corresponding to the number of locking openings 50A, 50B, 60, 60B, which is to say that it comprises in this case four pins 5A, 5B, 6A, 6B designed to engage respectively with the openings 50A, 50B, 60A, 60B. Preferably, the pins 5A, 5B, 6A, 6B have a mounting that is mobile in translation on the lid 3 between a retracted position (illustrated in FIG. 6) in which the pins 5A, 5B, 6A, 6B are retracted inside the lid 3 so that they do not protrude laterally beyond the latter, and a deployed position (illustrated in FIG. 5) in which each pin 5A, 5B, 6A, 6B penetrates into the respective opening 50A, 50B, 60A, 60B, wherein the passage from the retracted position to the deployed position (and vice-versa) takes place by a translation movement according to a Z-Z' direction that is substantially parallel to the main extension plane of the lid 3, which is preferably parallel to the base 2A of the pan 2.

According to the embodiment illustrated in the figures) the locking/release means 4 advantageously comprises two bifid segments 5, 6 positioned diametrically opposite relatively to one another with respect to the X-X' axis, wherein each bifid segment 5, 6 respectively forms the first pair of pins 5A, 5B and the second pair of pins 6A, 6B. For example, each bifid segment 5. 6 is formed by a one piece metal plate of which one of the ends has a fork shape, wherein each prong of the fork corresponds to a pin 5A, 5B, 6A, 6B.

Each segment 5, 6 is has a radial translation mounting with respect to the X-X' axis. Said segments 5, 6 are driven by any means known to a person skilled in the art. For example, as illustrated in the figures, the locking/release means 4 are manually controlled by the user. For this purpose, the pressure cooker 1 preferably comprises a control knob 7A mounted on the lid 3 which rotates according to the X-X' axis. The knob 7A is mechanically connected to the segments 5, 6 so that the rotation of the knob 7A in one direction causes the radial retraction (centripetal) of the pins 5A, 5B, 6A, 6B while the rotation of the knob 7A in the opposite direction inversely causes the centrifugal radial movement of the pins 5A, 5B, 6A, 6B allowing the latter to be engaged into the corresponding locking openings 50A, 50B, 60A, 60B.

The segments 5, 6 may be driven by the knob 7A by any means known to a person skilled in the art. For example, the knob 7A may be attached to a plate which has drive openings 70 in it, wherein the segments 5, 6 are themselves fitted with respective pins 51 that are engaged in the drive openings 70. Consequently, the rotation of the knob 7A causes the concomitant rotation of the drive openings 70 which, by a ramp effect and in combination with a translation guidance of the segments 5, 6, transform their rotational movement into a radial translation movement of said segments 5, 6.

Compliant with the invention, the pressure cooker 1 comprises a trim 8 made of plastic which substantially covers all of the outside face 3" of the lid 3, wherein the trim 8 is preferably not easily detachable by the user. In other terms, the trim 8 is positioned in line with the outside face 3" so that when the lid 3 is added to the pan 2, the main body 3A of the lid is masked by the trim 8, in particular so as to prevent the user from touching the body 3A directly. Thanks to this feature, the general physiognomy of the pressure cooker 1 will differ considerably from that of the known pressure cookers. Indeed, when the lid 3 is added to the pan 2, it appears to the user that the lid 3 is made entirely from plastic, as the metallic parts 3A, 3B are substantially masked, as illustrated in the figures. This helps to diminish the feeling of fear that the user could experience, as plastic, contrary to metal, is not generally associated to appliances subjected to high thermo-mechanical stresses, as is the case of pressure cookers. Above all, the plastic trim 8 permits a thermally insulated layer to be formed which reduces or even eliminates totally the risk of burns, especially when the user uses the control knob 7A to open or close the appliance, or control another function (decompression, calibration of the operating pressure, etc.). This function is increased further by the non-detachable nature of the trim 8, which is to say that the user cannot separate the trim 8 from the lid 3 during normal operation of the pressure cooker 1.

The term "plastic" must be here considered in its widest sense, which is to say that it designates in general any synthetic (or even natural) material that is formed by macromolecules. Of course, the plastic used for the trim 8 is selected in accordance with its thermal and mechanical properties, to resist in particular the heat emitted by the lid 3, For example, the trim 8 is advantageously made from a thermoplastic heat resistant material, such as polybutylene terephtalate (PBT).

The trim 8 may be formed by a one-piece part located on the outside face 3" of the lid 3. It may also be envisaged, and this also corresponds to the embodiments illustrated in the figures, that the trim 8 is formed of several distinct independent parts positioned adjacent to the outside face 3" of the lid 3, wherein the user cannot easily separate each component part of the trim 8 of the lid 3. Consequently, in the example illustrated in the figures, the trim 8 comprises a control module 9 substantially with a general revolution form. Said control module 9 comprises the knob 7A, wherein the latter is mounted in rotation according to the Y-Y' axis on a plate equipped with an annular shaped cover 7B concentrically surrounding the knob 7A, in the extension of the base of the latter. The module 9, which comprises in particular the knob 7A and the cover 7B, is positioned in the centre of the lid 3, on the outside face 3". Preferably, the module 9 is attached removably to the lid 3, in order to facilitate its cleaning in a dishwasher. For this purpose, the plate onto which the knob 7A and the cover 7B are mounted is attached with a threaded rod 9A and a nut 9B on the main body 3A of the lid 3, in the centre of the latter.

In the example illustrated in the figures, the trim 8 comprises, apart from the module 9 whose covering diameter D1 is smaller than that of the outside face 3" of the lid 3 onto which it is added, a crown 10, preferably made from moulded thermoplastic. The crown 10 surrounds the module 9 and covers the peripheral zone of the outside face 3" that is not covered by the module 9. Finally, in the embodiment illustrated in the figures, the trim 8 is formed by the association of the knob 7A, the cover 7B and the crown 10. All of these parts are made of plastic, and preferably a thermoplastic material.

The trim 8 is preferably attached to the lid 3, for example in the following manner which relates to the embodiments illustrated in the figures:
- the module 9 is subject to the lid by means of the threaded rod 9A/nut 9B system described above,
- the crown 10 is also screwed onto the lid 3, and preferably onto the main body 3A of the lid 3; for example, as illustrated in the figures, the crown 10 is attached to the lid 3 by means of two screws 10A, 10B positioned diametrically opposite one another with respect to the axis of symmetry Y-Y' of the lid 3 and engages with a corresponding tapped hole located directly in the crown 10, which is preferably manufactured by moulding.

Advantageously, the trim 8 is attached permanently on said lid 3, which is to say that it is difficult or even impossible for the user to separate the trim 8 from the lid, Indeed, in one preferred embodiment of the invention, the trim 8 is designed so that it remains permanently on the lid 3 of the pressure cooker 1, throughout its life. This technical measure helps to ensure the safety of the user as the latter may not simply remove the trim 8 from the lid 3 and access the heat conductive parts of the pressure cooker 1.

Preferably, as illustrated in the figures, the trim 8 is attached to the lid 3 in discrete zones (in this case corresponding to the position of the attachment parts 9A, 10A, 10B) so that the deformation profile that be passed onto the lid 3 under the effect of an increase in the pressure inside the chamber is not passed onto the trim 8, at least not entirely.

In other terms, the means of attaching the trim 8 to the lid 3 permit the deformation profile of the lid 3 under the effect of the increase in pressure inside the chamber to be entirely communicated to the trim 8, so that the user substantially does not perceive any significant deformation phenomenon when the pressure cooker 1 is operating.

This function is preferably obtained, as mentioned above, by preferring discrete attachment points, which is to say located between the trim 8 and the lid 3. In particular, it is especially interesting, in order to obtain the desired effect, to position these attachment points (corresponding to the attachment parts 9A, 10A, 10B), substantially close to the axis Z-Z' on which the segments 5, 6 act. Indeed, in the example illustrated in the figures, the deformation of the lid 3 under the effect of the pressure inside the chamber is of course minimal, or even substantially null, at the pins 5A, 5B, 6A, 6B as the latter, once engaged into the corresponding openings 50A, 50B, 60A, 60B prevent any movement of the lid 3 locally. Consequently, in the embodiments illustrated in the figures, the lid 3 deforms according to a profile that is substantially in the form of a wave, wherein the free peripheral edges of the lid are substantially situated at 90° from the action zone where the segments 5, 6 undergo the greatest deformation. On the contrary, the deformation of the lid is minimal according to the Z-Z' axis of action of the segments 5, 6. Consequently, by attaching the trim 8 close to the action zone of the segments 5, 6 and by allowing sufficient clearance between the lid 3, and more precisely its main body 3A, and the trim 8, especially the crown 10, it is possible to avoid the transmission of significant deformation to the trim 8. Indeed, thanks to the clearance between the trim 8, and especially the crown 10, and the lid 3, the latter may freely deform underneath the trim, without transmitting any significant deformation to the trim 8.

Advantageously, the trim 8, which is thus attached to the lid 3, overlaps the latter to form means 8' of contact designed to come into contact with the pan 2, so that when the means 8' of contact come into contact with the pan 2, the lid 3 is suspended from the trim 8 and positioned inside the pan 2 in a predetermined sealing position to form the cooking chamber with the pan 2. In other terms, the trim 8 extends not only in line with the outside face 3" of the lid 3 but also extends radially beyond said outside face 3" to form an edge designed to come into contact with the pan, and preferably with the upper free edge 2G of the pan 2, wherein said edge forms the means 8' of contact. In the example illustrated in the figures, the means 8' of contact are formed by the crown 10, which extends radially beyond the lid 3 so as to form a contact edge designed to rest against the pan 2. Preferably, this contact edge in the shape of an arc of a circle itself has contact bosses 800 permitting precise contacts to be made punctually, in order to control even more efficiently the position of the lid 3 relative to the pan 2.

The trim 8 thus has a double function, on the one had a trim function itself which permits the general appearance of the pressure cooker 1 to be modified and to protect the user against the risks of burns, while improving the overall energy performances of the pressure cooker, and on the other hand a vertical positional control function of the lid 3 in the pan 2.

In particular, thanks to the use of the means 8' of contact, the fatigue of the seal 3C can be limited, which does not have to support the entire weight of the lid 3 give that this weight is distributed by the edge of the crown 10 which overlaps the lid and comes into contact with the free edge 2G of the pan 2.

The means 8' of contact thus permit the lid 3 to be vertically indexed with respect to the pan, which is to say that the lid is precisely positioned relative to the pan especially as concerns:

the relative position created between the pan 2 and the lid 3 is such that the seal 3C is sufficiently under constraint to create the seal but not enough for it act as a vertical stop, such that less fatigue is generated;

the pins 5A, 5B, 6A, 6B are positioned at exactly the same height as the corresponding openings 50A, 50B, 60A, 60B, which allows the user to lock and release the lid 3 very easily and without any need for a particular effort.

This combined implementation of an inside lid 3 and vertical indexation means moreover constitutes a distinct invention as such, independently of whether the trim covers or not the entire outside face 3" of the lid 3. More precisely, this distinct and independent invention relates to a domestic pressure cooker at least comprising a pan 2 and a lid 3 designed to be added to the pan 2 to form a cooking chamber with the latter, wherein said pan 2 has an inside face 30 positioned opposite the inside of the pan 2 and an outside face 31 opposite, wherein said pressure cooker 1 comprises means 8' of contact attached to the lid 3 and designed to come into contact with the pan 2, so that when the means 8' of contact come into contact with the pan 2, the lid 3 is suspended by the means 8' of contact and is positioned inside the pan 2 in a predetermined sealing position to form the cooking chamber with the pan. In this case, the means of contact are preferably formed by a trim, which advantageously comprises at least the crown 10 or any other means capable of creating a stop with stable contact on the pan 2, and in particular on the free edge 2G of the pan 2.

Advantageously, and in compliance with the embodiments illustrated in the figures, the trim 8 overlaps (radially) the lid 3 to form means 8" of indexation designed to engage with complementary means of reception 2H fitted to the pan 2, substantially to prevent any rotation of the lid 3 relative to the pan 2 around its axis of symmetry Y-Y', when the lid 3 is added to the pan 2. In other terms, the engaging of the means 8" of indexation with the complementary means 2H of reception permits, in the horizontal plane, the lid 3 to be immobilised in position, wherein said position is of course preferably chosen to permit exact alignment exact of the pins 5A, 5B, 6A, 6B with the corresponding locking openings 50A, 50B, 60A, 60B. The means 8" of indexation and complementary reception 2H thus permit indexation in the horizontal plane of the lid 3 relative to the pan 2. In the embodiment illustrated in the figures, the trim 8 thus has a triple function of trim, vertical indexation and horizontal indexation. Of course, it may be envisaged that the trim 8 only has trim and vertical indexation functions, or alternatively trim and horizontal indexation functions, wherein the simultaneous presence of the three functions, even though preferred, is not necessarily obligatory.

Advantageously, the pan 2 at least comprises a gripping part 20, which is preferably attached to the wall of the pan 2. The gripping part 20 is designed to permit the user to handle not just the pan 2 on its own but also and most especially the complete pressure cooker 1 (formed by the pan 2 and lid 3 assembly), in particular when said pressure cooker 1 is filled with food that is cooked or to be cooked, possibly accompanied by a cooking liquid. The gripping part 20 is therefore designed to permit the pressure cooker 1 to be held easily and firmly, so that the user may move the pressure cooker 1 manually as required without the risk of the latter being dropped. Preferably and as illustrated in the figures, the gripping part 20 at least comprises one, and preferably two handles 21, 22 attached to the lateral wall 2B of the pan 2, preferably in the second upper portion 2F of said wall, outside of the latter. Each handle 21, 22 substantially extends from the outside face 31 of the pan 2, radially with respect to the X-X' axis, towards the outside of the pan. The two handles 21, 22 are preferably positioned diametrically opposite with respect to one another in consideration of the X-X' axis.

Very advantageously, the gripping part 20 bears the complementary reception means 2H, and even more preferentially the gripping part 20 is conformed to form said complementary reception means 2H itself.

Consequently, in the example illustrated in the figures, each handle 21, 22 is conformed to form the complementary reception means 2H designed to engage with the means 8" of indexation, itself formed by the trim 8, and preferably by the crown 10.

Advantageously, the means 8" of indexation and the complementary reception means 2H are designed to engage with one another.

For example, the trim 8 preferably comprises at least one lug 11 which overlaps the lid 3 to form the means 8" of indexation, wherein the gripping part 20 has a concave portion 21A forming the reception means 2H and designed to receive said lug 11, so as to engage with the latter (preferably by meshing).

Advantageously and in compliance with the embodiments illustrated in the figures, the trim 8 comprises two lugs 11, 12 which preferably are made from the same material as the crown 10 and which overlap radially and diametrically opposite the lid 3 to form the means 8" of indexation. The gripping part 20 has two concave portions 21A, 22A respectively fitted in each handle 21, 22, wherein the form of each concave portion 21A, 22A is complementary to that of the lugs 11, 12 to accommodate the latter in an adjusted manner so as to prevent any subsequent rotation of the assembly formed by the trim 8 and the lid 3. Preferably the lugs 11, 12 are identical, as are the concave portions 21A, 22A, to permit each concave portion 21A, 22A to accommodate indifferently either one of the lugs 11, 12. This permits two operating positions of the lid 3 to be authorised relative to the pan 2, which facilitates the use of the pressure cooker 1.

Consequently, with just two parts, which is to say the trim 6 and at least one handle 21, 22, it is possible to create vertical and horizontal indexation of the lid 3, which is of particular interest when the locking/release means 4 precisely require a specific position of the lid 3 relative to the pan 2.

It is furthermore remarkable to note that all of these functions are obtained using parts which may preferably be made of plastic, which is to say using methods (like moulding) which easily permit the conformation of complex parts. The parts, which for reasons of thermo-mechanical resistance, must be made of metal, and consequently are more expensive and difficult to make, do not require any particular operation to create their form.

The implementation of horizontal indexation means associated to an inside lid 3 furthermore constitutes a separate invention that is distinct from the inventive aspects described above, and in particular independent due to the fact that the trim 8 covers all or part of the outside face 3" of the lid 3.

This independent invention relates more particularly to a domestic pressure cooker 1 comprising at least a pan 2 and a lid 3 designed to be added to the pan 2 to form a cooking chamber with the latter, wherein said lid 3 is an inside lid which is to say designed to be introduced inside the pan 2 and consequently surrounded by the lateral wall 2B of the latter, wherein said pressure cooker 1 comprises means 8" of indexation attached to the lid 3 and designed to engage with complementary reception means 2H substantially to prevent any rotation of the lid 3 relative to the pan 2 around its axis of symmetry Y-Y'.

Advantageously, and as illustrated in the figures, the trim 8 comprises a collar which overlaps the lid 3 to form preferably the means 8' of contact, wherein said collar is also conformed locally to form the lugs 11, 12. This collar, which thus forms both the lugs 11, 12 and the means 8' of contact is made of the same material as the crown 10.

Advantageously, the collar is designed so that it does not overlap the pan 2 radially when the lug 11 is accommodated in the corresponding concave portion 21A and the lid 3 is therefore in its predetermined sealing position (the lug 12 is then accommodated in the concave portion 22A, given that it is also possible, when the trim 8 advantageously has a symmetrical nature as illustrated in the figures, that the lug 11 is accommodated in the concave portion 22A and that the lug 12 is accommodated in the concave portion 21A). Consequently, as may be seen in the figures, the collar is always either in the extension of the lateral wall 2B, or in the extension of one of the handles 21, 22, which are generally made from a heat-resistant material such as a heat-hardening plastic or a metal.

Thanks to this technical measure, it may be envisaged that the crown 10 is made a thermoplastic material without deviating from the safety standards in effect.

Advantageously, the pressure cooker 1 is designed so that when the indexation means 8" are not engaged with the complementary reception means 2H substantially to prevent any rotation of the lid 3 relative to the pan 2 around its axis of symmetry Y-Y', the means 8' of contact are kept at a sufficient distance from the pan 2 so as to prevent the lid from reaching its predetermined sealing position. This advantageous technical measure is implemented in the pressure cooker 1 corresponding to the embodiment illustrated in FIGS. 9 and 10, wherein the embodiments of FIGS. 1 to 8 and 9 and 10 only differ in this point. According to the embodiment of FIGS. 9 and 10, the collar which forms both the means 8' of contact and indexation means 8" is designed to come into contact against the gripping part 20 when the lug 11 is not accommodated in the corresponding concave portion 21A (or more precisely in this case when the lugs 11, 12 are not accommodated in their respective concave portion 21A, 22A), so as to keep the lid 3 out of its predetermined sealing position, which is to say raised sufficiently so that the seal 3C is no longer in impervious contact with the inside wall 30 of the pan 2. Consequently, the only configuration which permits an impervious cooking chamber to be created is that in which the lugs 11, 12 are engaged in the corresponding cavities 21A, 22A, any other orientation of the lid 3 in relation to the pan 2 leads to the collar pressing on the handles 21, 22, thus preventing the lid from descending to its impervious position.

Figure 9:
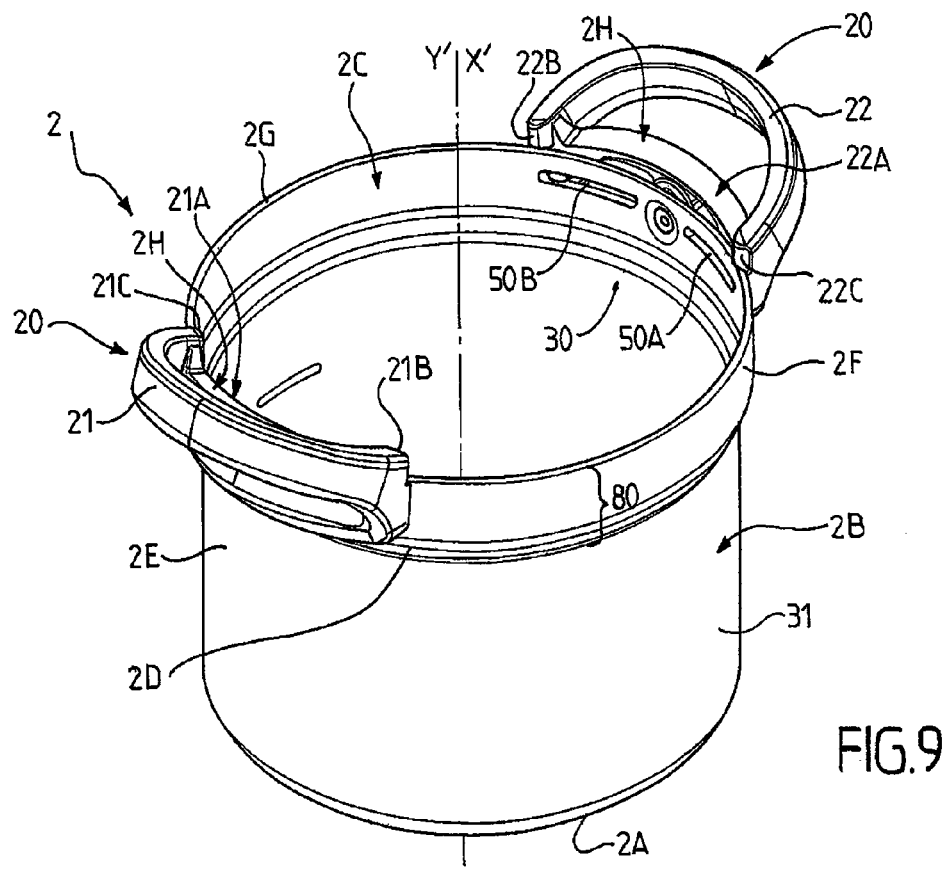
FIG. 9 illustrates, according to a general perspective view, the pan of a pressure cooker compliant with a second embodiment of the invention.
Figure 10:
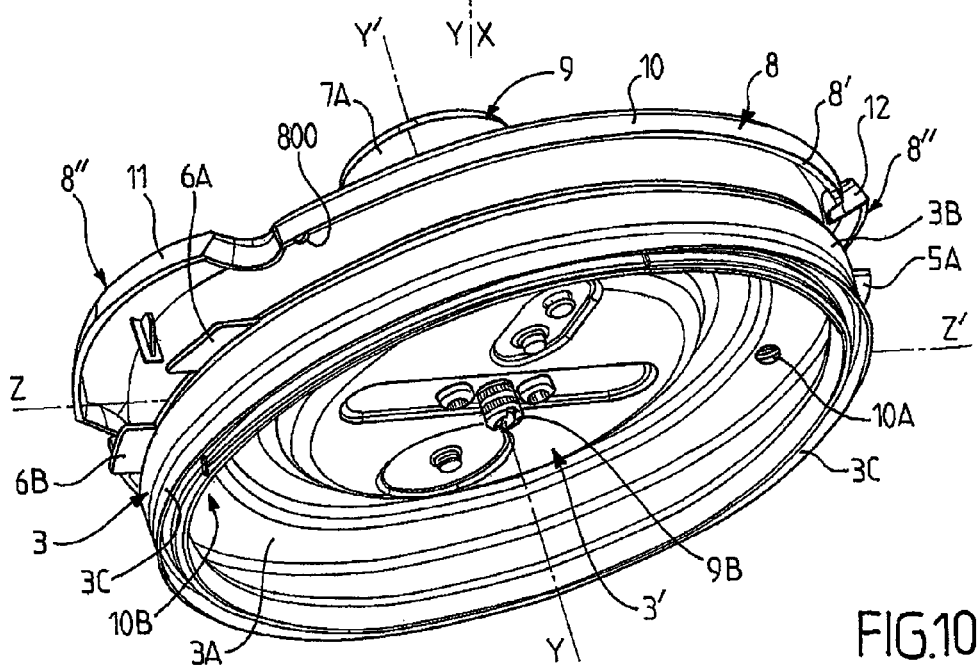
FIG. 10 illustrates, according to a perspective view, a lid/trim sub-assembly designed to be associated to the pan of FIG. 9.

In order to accomplish this safety function, the handles 21, 22 have for example, as is illustrated in FIG. 9, protuberances 21B, 21C, 22B, 22C pointed towards the inside of the pan 2, s as to form contact surfaces for the means 8' of contact when the lid 3 is incorrectly positioned on the pan 2.

Very preferably, the handles 21, 22 are located on the outside of the pan 2, opposite the locking openings 50A, 50B, 60A, 60B to mask the latter from the view of the user when the lid 3 is added to the pan 2.

The locking/release means 4 are advantageously masked by the trim 8, given that the majority of the locking/release means 4 is positioned between the outside face 3" of the lid 3 and the trim 8.

In this way, the structure and the operation of the locking/release means 4 is substantially entirely hidden from the eyes of the user, which helps to make the appliance more reliable (as all of the moving parts and openings are consequently protected) but also to reduce the feeling of fear that may be experienced by the user, who does not perceive the technical nature of the pressure cooker.

The invention claimed is:

1. Domestic pressure cooker (1) comprising at least a pan (2) having a wall and a lid (3) designed to be added to the pan (2) to form a cooking chamber with said pan, wherein said lid (3) has an inside face (3') designed to be positioned opposite the inside of the chamber and an outside face (3") opposite, and including a plastic trim (8) which substantially covers all of said outside face (3), and a locking means for locking said lid to said pan, said plastic trim being independent from said locking means; and in which the lid (3) has an axis of symmetry (Y-Y') and in that the trim (8) is attached to the lid (3) and overlaps the latter to form indexation means (8") designed to cooperate with complementary reception means (2H) fitted to the pan (2), substantially to prevent any rotation of the lid (3) relative to the pan (2) around its axis of symmetry (Y-Y').

2. Pressure cooker (1) according to claim 1 in which when the indexation means (8") are not engaged with the complementary reception means (2H) substantially to prevent any rotation of the lid (3) relative to the pan (2) around its axis of symmetry (Y-Y'), the contact means (8') are kept at a sufficient distance from the pan (2) to prevent the lid (3) from reaching its predetermined sealing position.

3. Pressure cooker (1) according to claim 1 in which the pan (2) at least comprises a gripping part (20), wherein said gripping part (20) bears the complementary reception means (2H).

4. Pressure cooker (1) according to claim 3, in which the indexation means (8") and the complementary reception means (2H) are designed to engage into one another.

5. Pressure cooker (1) according to claim 4, in which the trim (8) at least comprises a lug (11, 12) which overlaps the lid (3) to form the indexation means (8"), wherein the gripping part (20) has a concave portion (21A, 22A) forming the reception means (2H) and is designed to accommodate said lug (11, 12).

6. Pressure cooker (1) according to claim 5, in which the trim (8) comprises a collar which overlaps the lid (3), wherein said collar is designed to come into contact against the gripping part (20) when the lug (11, 12) is not accommodated in the concave portion (21A, 22A), so as to keep the lid (3) out of its predetermined sealing position.

7. Pressure cooker (1) according to claim 6, in which when the lug (11, 12) is accommodated in the concave portion (21A, 22A) and the lid (3) is in its sealing position, the collar is designed so that it does not overlap the pan (2) radially.

8. Pressure cooker (1) according to claim 1 in which the trim (8) is attached to the lid (3) in discrete zones, the lid having a deformation profile when the pressure cooker is in use, so that the deformation profile that may be passed onto the lid (3) under the effect of an increase in pressure inside the chamber is not communicated to the trim (8), or at least not entirely.

9. Pressure cooker (1) according to claim 1 in which said locking means (4) comprise at least a locking opening (50A, 50B, 60A, 60B) located in the wall of the pan (2) and a pin (5A, 5B, 6A, 6B) with a mobile mounting on the lid (3) between a position where the lid (3) is locked in which the pin (5A, 5B, 6A, GB) is engaged in the locking opening and a position where the lid (3) is released in which the pin (5A 5B, 6A, 6B) is cleared from the locking opening.

10. Pressure cooker (1) according to claim 9 in which the locking means (4) are masked by the trim (8).

11. Pressure cooker (1) according to claim 1 in which the pan (2) comprises a lateral wall (2B), wherein said lateral wall (2B) itself comprises a convergent portion (2D) against which the lid (3) is designed to come into contact inside the pan (2), to form the cooking chamber.

12. Pressure cooker (1) according to claim 1 in which the trim (8) is made of a thermoplastic material.

13. Pressure cooker (1) according to claim 1 in which said cooker is designed to be associated to an independent external source of heat.

14. Domestic pressure cooker (1) comprising at least a pan (2) having a wall and a lid (3) designed to be added to the pan (2) to form a cooking chamber with said pan, wherein said lid (3) has an inside face (3') designed to be positioned opposite the inside of the chamber and an outside face (3") opposite, and including a plastic trim (8) which substantially covers all of said outside face (3), and a locking means for locking said lid to said pan, said plastic trim being independent from said locking means; and in which the trim (8) is attached to the lid and overlaps the latter to form contact means (8') designed to come into contact with the pan (2), so that when the contact means (8') come into contact with the pan (2), the lid (3) is suspended from the trim (8) and is positioned inside the pan (2) in a predetermined sealing position to form the cooking chamber with the pan (2).

15. Pressure cooker (1) according to claim 14 in which the trim (8) is attached to the lid (3) in discrete zones, the lid having a deformation profile when the pressure cooker is in use, so that the deformation profile that may be passed onto the lid (3) under the effect of an increase in pressure inside the chamber is not communicated to the trim (8), or at least not entirely.

16. Pressure cooker (1) according to claim 14 in which said locking means (4) comprise at least a locking opening (50A, 50B, 60A, 60B) located in the wall of the pan (2) and a pin (5A, 5B, 6A, 6B) with a mobile mounting on the lid (3) between a position where the lid (3) is locked in which the pin (5A, 5B, 6A, GB) is engaged in the locking opening and a position where the lid (3) is released in which the pin (5A 5B, 6A, 6B) is cleared from the locking opening.

17. Pressure cooker (1) according to claim 16 in which the locking means (4) are masked by the trim (8).

18. Pressure cooker (1) according to claim 14 in which the pan (2) comprises a lateral wall (2B), wherein said lateral wall (2B) itself comprises a convergent portion (2D) against which the lid (3) is designed to come into contact inside the pan (2), to form the cooking chamber.

19. Pressure cooker (1) according to claim 14 in which the trim (8) is made of a thermoplastic material.

20. Pressure cooker (1) according to claim 14 in which said cooker is designed to be associated to an independent external source of heat.

* * * * *